United States Patent

Knapp

[11] Patent Number: 5,813,435
[45] Date of Patent: Sep. 29, 1998

[54] SINGLE HANDLE MIXING VALVE WITH AN IMPROVED BALL VALVE

[75] Inventor: Alfons Knapp, Klockstr, Germany

[73] Assignee: Masco Corporation, Taylor, Mich.

[21] Appl. No.: 875,333

[22] PCT Filed: Feb. 6, 1995

[86] PCT No.: PCT/US95/01612

§ 371 Date: Jul. 11, 1997

§ 102(e) Date: Jul. 11, 1997

[87] PCT Pub. No.: WO96/24793

PCT Pub. Date: Aug. 15, 1996

Related U.S. Application Data

[63] Continuation-in-part of PCT/US92/10739 filed Dec. 11, 1992.

[51] Int. Cl.[6] .................................................. F16K 27/08
[52] U.S. Cl. .............................. 137/625.41; 137/625.16
[58] Field of Search ......................... 137/625.15, 625.16, 137/625.4, 625.41, 625.46, 625.47

[56] References Cited

U.S. PATENT DOCUMENTS

| 2,592,062 | 4/1952 | Perry . |
| 3,056,418 | 10/1962 | Adams et al. . |
| 3,417,783 | 12/1968 | Manoogian et al. . |
| 4,043,359 | 8/1977 | Christo . |
| 4,200,123 | 4/1980 | Brandelli . |
| 4,932,433 | 6/1990 | Knapp . |
| 5,469,889 | 11/1995 | Tang . |

*Primary Examiner*—John Fox
*Attorney, Agent, or Firm*—Reising, Ethington, Learman & McCulloch

[57] ABSTRACT

A mixing valve (10) has a control stem (42) for adjusting the movable ball valve (24) for controlling the flow rate and temperature mix of the mixed water. The ball valve (24) has a pair of slots (60) and a pin (64) extending through the slots (60) of ball valve (24). The stem (42) has a brace (80) extending into the ball valve and abuts against the pin (64). The pin (64) is journaled in a cartridge (56) such that the ball is vertically affixed to the cartridge (56) and is prevented from falling out the bottom open end (92) of the cartridge.

51 Claims, 5 Drawing Sheets

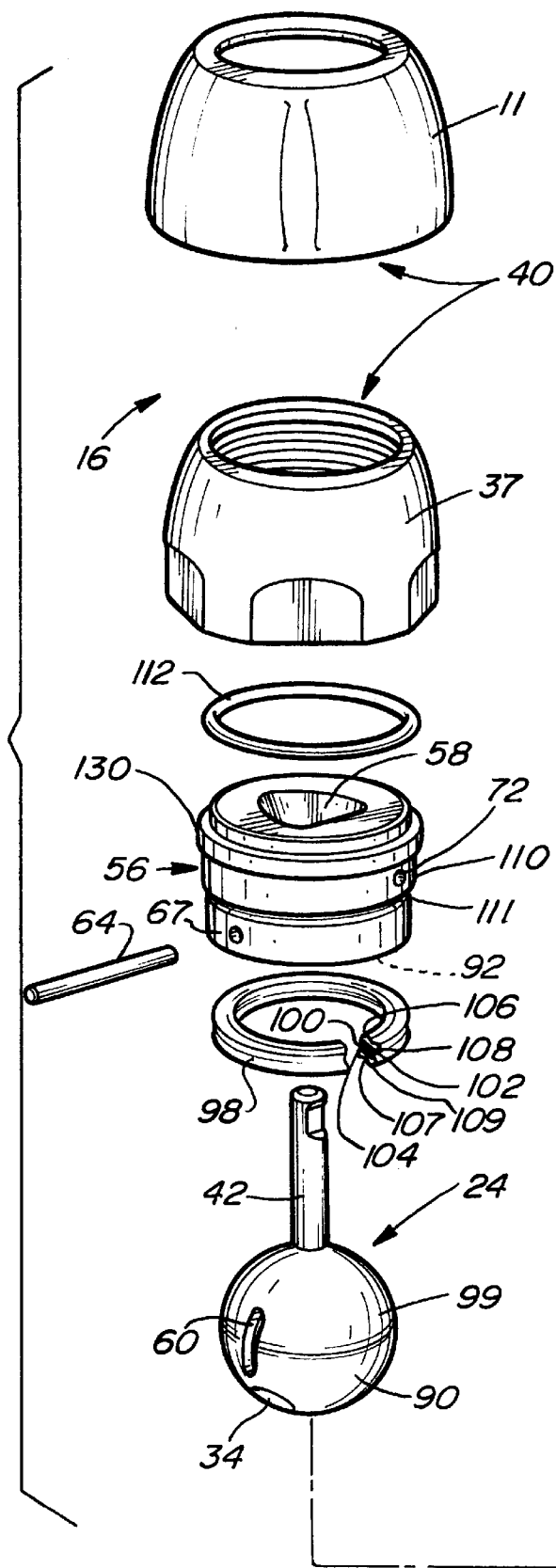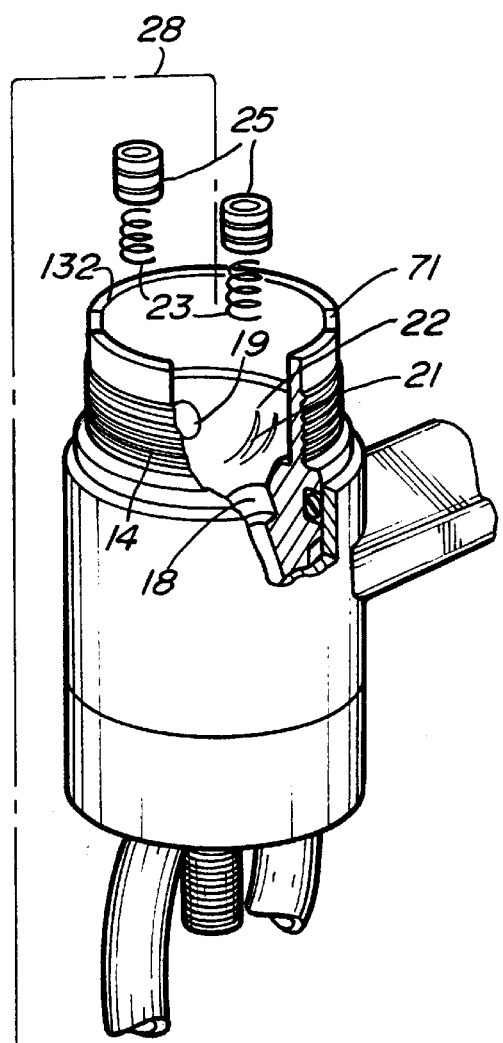
Fig-2

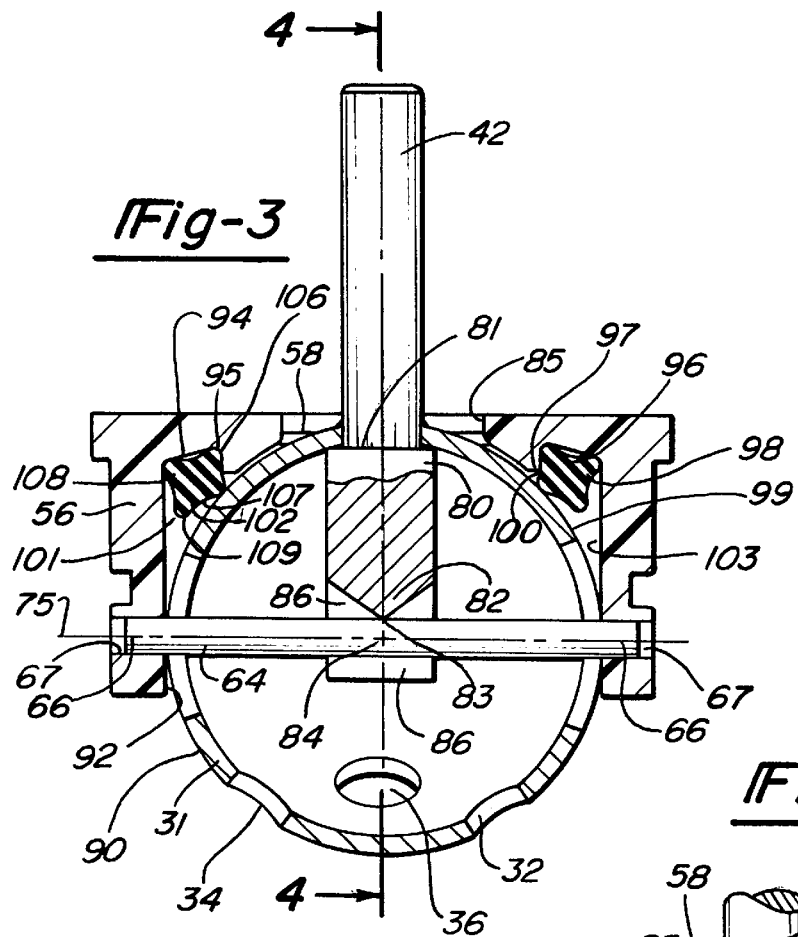
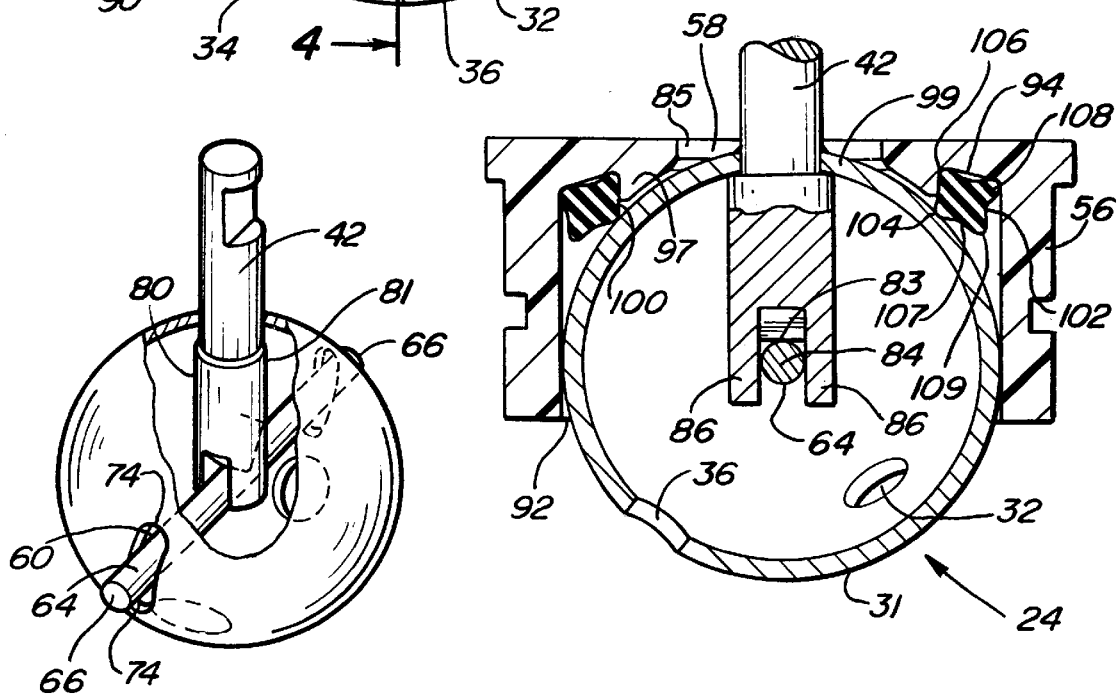

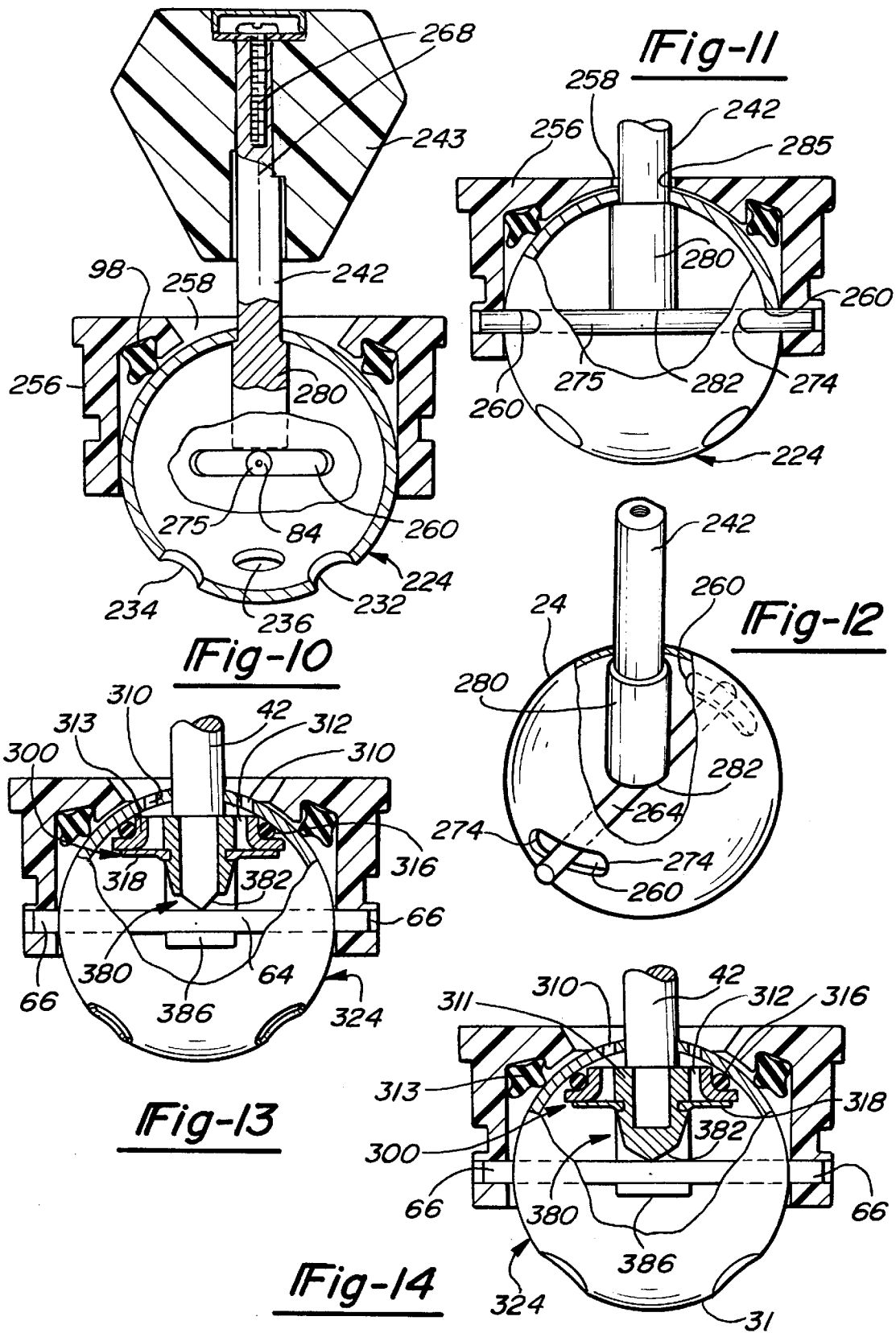

SINGLE HANDLE MIXING VALVE WITH AN IMPROVED BALL VALVE

This application is a continuation-in-part of co-pending United States Application PCT/US92/10739 filed on Dec. 11, 1992 entitled A Mixer Valve Having A Ball Valve Element Housed In A Cartridge.

TECHNICAL FIELD

The field of this invention relates to a faucet mixing valve and more particularly to a mixing valve ball valve cartridge.

BACKGROUND OF THE DISCLOSURE

Single handle faucets, commonly referred to as mixing valves, that control the flow of both hot and cold water have seen vast consumer acceptance. The faucets are commonly constructed such that a handle or knob is movable in two distinct directions to adjust the mix of hot and cold water and to adjust the volume rate, i.e. flow.

The two basic types of mixer valves that have seen widest commercial acceptance are plate valves and ball valves. Ball valves offer a reliable compact construction that is durable. Plate valves offer a drive mechanism that can be easily packaged into a cartridge form.

Known plate valve cartridges have housed the movable and fixed valve plates. The cartridge can easily be removed and replaced with another in order to effect an easy repair to the faucet. After the water supply is turned off, the faucet is merely opened and the cartridge is easily replaced. This type of repair can be accomplished without the need to call in skilled labor.

While plate valves have long been incorporated into a cartridge format, ball valves have not previously been amenable to a cartridge construction. The difficulties in the development of a commercially successful cartridge for a ball valve are several fold. Firstly, the floating nature of the traditional ball valve demanded that any cartridge completely surround and capture the ball valve, otherwise the ball valve simply falls out of the bottom of the cartridge. Secondly, the compact nature of the ball valve construction in the faucet body leaves little room for the inclusion of a cartridge. The introduction of traditional cartridges that house and capture the ball into the faucet housing demands that the housing be made taller to incorporate the added height needed for the inclusion of the cartridge.

Furthermore, traditional cartridges inhibit repair to worn elastomeric seals. The cartridge houses both the moving valve element and the fixed valve ports which often include the elastomeric port seals. Most of the wear and resulting leakage in a faucet is the result of the repetitive motion of the moving valve element on the elastomeric port seals. Because the seals are encased in the cartridge, the entire cartridge is replaced including the replacement of many yet good cartridge components that still have long useful life. The desire to eliminate waste however is offset by the need to simplify the repair operation. Furthermore, many cartridges are permanently assembled and do not permit dismantling.

Even for cartridges that can be dismantled, the advantages of a cartridge is lost if the cartridge dismantled into all of its component parts. The movable valve element falls out and is often not replaced in its correct orientation. This misinstallation can easily occur for symmetrical plate valves and ball valves which are inherently symmetrical. It takes a knowledgeable and skilled person to avoid mounting certain ball valves in a cartridge in its incorrect orientation.

Recently, ball valves have been devised that allow the handle to be operated in the same fashion as the commercially accepted plate type mixer valve. Some of these ball type mixer valves require the introduction of another moving part in the form of a rotatable plate mounted above the ball valve element. One such ball valve is disclosed in U.S. Pat. No. 4,449,551 issued to Lorch on May 22, 1984.

Another ball construction which mimics the desirable handle motion of commercially popular plate valves is disclosed in my PCT publication WO 92/22765 published on Dec. 23, 1992 which incorporates a horizontal pin extending through the ball valve to position the ball in the housing. This construction virtually eliminates the floating or spongy feeling during operation of the ball valve faucet.

The handle motion provided by the faucets disclosed in these two above noted disclosures is substantially the same. The ball valve construction allows for an orbiting motion of the handle about a fixed longitudinal axis of the valve body and a rocking, i.e. pivoting, motion about a movable horizontal axis relative to the valve body. The horizontal axis is perpendicular to the longitudinal axis of the valve body and is fixed with respect to the handle such that it moves about the housing as the handle rotates about the fixed longitudinal axis. The one distinguishing characteristic of this type of handle motion is that when the handle is pivoted to an off position, the desired mix ratio of hot and cold water can be remembered by the location of the handle so that when the faucet is turned back on, the same mix of hot and cold water flows through the faucet.

My recent PCT Publication WO 94/13985 published on Jun. 23, 1994 discloses an improved cartridge for a ball valve which also mimics the motion of most plate valve faucets i.e. the orbiting motion about a fixed vertical axis and rocking motion about a movable horizontal axis. The PCT publication wo 94/13985 as it describes the construction of this improved cartridge is incorporated by reference.

On the other hand, alternative types of ball drive mechanisms may be desirable in certain situations. These alternative types of ball drive mechanisms have the fixed axis of rotation being transverse to the longitudinal axis of the faucet body i.e. horizontal on many lavatory faucets. One ball valve drive mechanism has the movable axis that is fixed relative to the ball being substantially perpendicular to the horizontal fixed axis. The movable axis of rotation is pivotable in a vertical plane about the fixed axis with motion of the ball and centered about a horizontal position. An example of this type of ball drive mechanism is disclosed in U.S. Pat. No. 3,056,418 issued to Adams et al. on Oct. 2, 1962. Another ball drive mechanism is known that has the fixed and movable axis in the vice versa position from that of the Adams disclosure. An example of this type of ball drive mechanism is disclosed in U.S. Pat. No. 2,592,062 to Perry on Apr. 8, 1952.

Yet another type of ball valve drive mechanism has the movable axis being substantially perpendicular to the fixed transverse axis and being substantially aligned with the control stem. This type of drive mechanism is disclosed in U.S. Pat. No. 3,417,783 issued to Manoogian on Dec. 24, 1968.

These noted alternative types of ball valve constructions have certain properties that either increase the cost of maintenance or make maintenance more frequent. In particular, the ball valve element is mounted between elastomeric inlet port seals positioned about the inlet ports of the valve body and a sealing gasket that is mounted under the valve cover or gap. The elastomeric port seals and gasket are all yielding and render a floating characteristic to the ball valve element between the valve body and cap. There is no positive lock or locator mechanism that securely affixes the ball valve in the vertical direction. Because the ball valve can be moved in a translational manner against the elastomeric elements, the operator when operating the handle can also move the handle a small amount in any direction including directions not intended in the design of the mixing valve. This unintended motion may render a undesirable spongy feel to the operation of the faucet and an uncertainty to the operator as to the proper operation of the faucet. Furthermore, the spongy feel of the handle gives the impression that the handle is unstable and not assembled properly.

The top sealing gasket in commercially known ball valve constructions provides three functions. Firstly, it seals against leakage of water about the ball. Secondly, its outer periphery seals against the inner surface of the housing to prevent leakage. Thirdly, the gasket resiliently positions the ball downwardly against the inlet seals against the water pressure exerted thereon. As a consequence, the gasket is a large and expensive component. To obtain a smooth operation, the elastomeric sealing gasket often has a thin layer of tetrafluoroethylene that contacts the ball valve to reduce wear as compared to direct contact of the elastomeric material with the ball member.

In order to reduce the floating feel, a regulation ring has been incorporated in many ball valve mixing valves. The regulation ring is adjustably screwed onto the valve cap. The regulation ring compresses the sealing gasket downward against the ball valve element. The increased compression of the sealing gasket against ball valve element reduces the undesirable spongy motion but does not eliminate it. Furthermore, the combining of the regulation ring with the known gasket increases the cost and complexity of the mixing valve. The increased pressure exerted on the sealing gasket wears the gasket down. As wear and tear progresses, the regulation ring must be repeatedly adjusted to restore pressure on the gasket to both seal and provide the operating faucet handle with an operating resistance to maintain the handle in a stable position and prevent gravitational forces exerted on the faucet handle from unintentionally moving the handle.

Furthermore, these alternative types of ball valve drive mechanisms have not been amenable to be advantageously installed in a cartridge assembly for several reasons. One reason is that there has yet to be developed a mechanism that adequately packages the ball within a conveniently sized cartridge while maintaining the ability to pivot the ball about the required two axies. Furthermore, no cartridge has been developed for a ball valve that limits the compressive pressure against the retaining top sealing gasket between the ball and cartridge to assure that the ball does not exert overly destructive force on the gasket.

What is needed is a ball valve construction that provides for all the different types of ball valve mechanisms to be housed in a cartridge for a mixer valve that operably seats the ball valve. What is also needed is a cartridge for a ball valve that provides top sealing gasket element that seals against leakage to the exterior of the housing and seats a ball valve element but allows access to the elastomeric port seals about the inlet ports.

SUMMARY OF THE DISCLOSURE

In accordance with one aspect of the invention, a faucet mixer valve for liquids has a ball valve element pivotably mounted in a cavity of a housing. The cavity is in fluid communication with a plurality of inlet ports and at least one outlet port. The ball valve has at least a partially spherical surface and a plurality of inlet openings in its surface. The openings cooperate with the ports to control fluid flow in both flow rate and temperature mix through the ports. The valve housing has a control opening. The ball valve has a control stem passing through the control opening. A handle may be operably connected to the stem. The cap member has a seal seat about the control opening. A sealing gasket is seated in the seal seat about the upper opening in the cap member and sealingly abuts against the movable ball valve element.

The ball valve has a first arcuate slot therethrough coaligned substantially about a great circle of the ball. A shaft is journaled in the body against any lateral sliding motion and extends through the slot of the ball. The ball valve is rotatable about an axis of the shaft at a point where the shaft extends through the slot. The shaft extends into the interior of the ball valve and abuts against a brace that is affixed against an upper section of ball valve.

In one embodiment, the ball valve is pivotably mounted to a cartridge housing. The mixer valve has a cavity which is sized to house the cartridge housing. The cartridge has a lower opening through which said ball valve element protrudes to be cooperative with the inlet ports such that the ball valve element directly abuts elastomeric inlet port seals housed at the downstream end of inlet ports. The brace provides support against the shaft to prevent the ball from undesirably dropping or rattling downward through the lower opening of the cartridge.

In accordance with another aspect of the invention, the faucet mixer valve has a valve element movably mounted to a cartridge housing that is received in a cavity of a faucet body. The body has a plurality of inlet ports and an outlet port in fluid communication with the cavity. The ball valve element as above described protrudes through a lower opening in the cartridge to be cooperative with the inlet ports. The shaft that extends through the slot of the ball that is journaled in the cartridge against any lateral sliding motion. The brace is affixed against an upper section of the ball valve and extends to and abuts the shaft to provide a support against the ball from dropping out of or rattling at the lower opening of said cartridge.

In one embodiment, a sealing gasket is seated in seal seat about said upper opening in said cartridge housing and sealingly abuts against the movable ball valve element. The cartridge housing has a depending flange interposed between said upper opening and the seal seat. The flange is in close proximity to the ball valve and provides a stop limit to the upward motion of the ball valve against the seal in order to control the maximum amount of compression of the seal.

Preferably, the brace member has an end including a dihedral that abuts against the shaft and lateral flanges that abut diametrically opposite sides of the shaft. The shaft extends to the center of said interior of said ball valve and the brace abuts against the shaft in proximity to the center of the shaft. In one embodiment, the contact of the brace with the shaft is slightly spaced from the center of the ball such that upon rocking motion of the ball valve along an axis perpendicular to the shaft from a mid position of the stem to a side position of the stem, the brace pushes the ball upward with respect to the shaft to further push the ball against the sealing gasket and compress the gasket between the ball valve and the cartridge.

Preferably the ball has a second arcuate slot diametrically opposed to said first slot. The shaft extends through both of said first and second slots and is seated at both its distal ends in either the cartridge housing or faucet body. The shaft preferably has a circular cross-section to provide relative rotation of the ball about the axis of the shaft.

In one embodiment, the slots are contoured to follow a great circle on the ball valve that defines a plane that is in proximity to a distal end of lever handle that is affixed to the control stem. The plane has a normal axis that is perpendicular to the shaft such that the ball valve may move in two directions, one of the directions being about the normal axis and a second direction being about the axis of the shaft.

In another embodiment, the slots are on a great circle that defines a plane that is normal to the control stem such that such that the ball valve may move in two directions, one of the directions being about a central longitudinal axis of the stem and a second direction being about the axis of the shaft.

In one embodiment, the brace member is an extension of the control stem that passes into the ball valve. In another embodiment, the brace member is a separate member that is rotatable with respect to the control stem and provides the dihedral angle and lateral flanges and rotates until properly oriented to allow the shaft to intrude between the lateral flanges upon installation of the shaft in the ball valve.

An anti-siphon valve may be housed inside the ball valve and seated about the brace. The anti-siphon valve is in communication with ambient atmosphere through an aperture in an upper section of the ball valve.

In accordance with the general aspect of the invention, a mixer valve has a ball valve cartridge with a ball valve having a slot therethrough. A protrusion is translationally affixed to the cartridge and extends through the slot of the ball. The ball is rotatable about an axis of the protrusion at a point where it extends through the slot of the ball. A support extends from the protrusion within a hollow interior section of the ball to abut against an upper section of the ball valve to provide a support against the ball from dropping down through the lower opening of the cartridge.

In accordance with another aspect of the invention, a ball valve for a faucet includes a ball valve surface having a first arcuate slot therethrough substantially about a great circle of said ball valve. A brace is affixed against an upper section of said ball valve and extends to and abuts against a shaft that is extendable through the slot of the ball. The ball is rotatable about an axis of the shaft.

BRIEF DESCRIPTION OF THE DRAWINGS

Reference now is made to the accompanying drawings in which:

FIG. 2 is an exploded perspective view of the mixer valve shown in FIG. 1;

FIG. 3 is a partially cross-sectional view of the cartridge member taken along line 3—3 shown in FIG. 1;

FIG. 4 is a fragmentary cross-sectional view of the taken along line 4—4 shown in FIG. 3 further illustrating the cartridge assembly;

FIG. 5 is an enlarged and partially segmented perspective view of the ball valve and pin shown in FIG. 2;

FIG. 10 is a view similar to FIG. 3 illustrating an embodiment of the invention that provides a different ball operating motion than the one shown in FIG. 3;

FIG. 11 is a fragmentary cross-sectional view of the taken along line 11—11 shown in FIG. 10 further illustrating the cartridge assembly; and FIG. 12 is a view similar to FIG. 5 illustrating the ball valve and pin shown in FIG. 11;

FIG. 13 is view showing a modification to the ball valve that incorporates an anti-siphon valve; and FIG. 14 is a view of an alternate embodiment that incorporates an anti-siphon valve.

DETAILED DESCRIPTION OP THE PREFERRED EMBODIMENT

Figure 1:
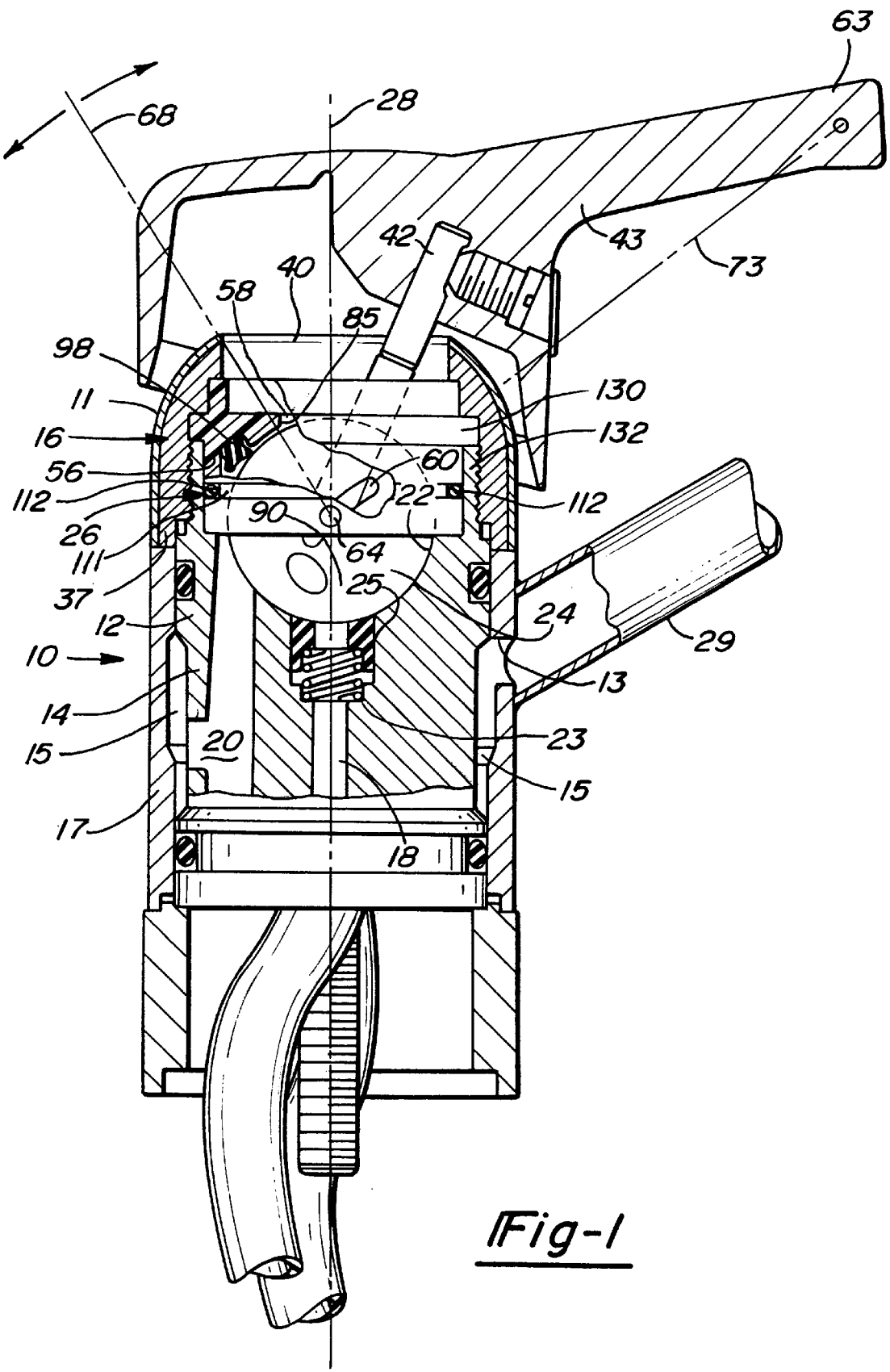
FIG. 1 is a side elevational and partially segmented view of a faucet mixer valve according to one embodiment of the invention illustrating the faucet in the off position.

Referring now to FIGS. 1–5, a mixing valve 10 has a conventional valve housing 12 that is formed from a housing base member 14 and a cover assembly 16. The base member 14 has a cavity 22 formed therein with a substantially semi-spherical lower surface 21. Two inlet ports 18 and 19 for cold and hot water have downstream ends counter bored into the lower surface 21 to form a seat for two biasing springs 23 which bias tubular elastomeric sealing elements 25 against a ball valve element 24 that is housed in a cartridge 26. An outlet passage 20 extends from the lower surface 21 and through a side cylindrical wall 27 for the passage of mixed water from cavity 22.

A conventional tubular shell 17 is sealingly and slidably mounted about the lower base member 14 and forms an annular chamber 15 in fluid communication with the outlet passage 20. A spout 29 is affixed to the shell and in fluid communication with the annular chamber 15 through aperture 13 in shell 17. The cover assembly 16 includes a threaded member 37 that is screwed onto the base member 14. A cosmetic shell 11 can be positioned over the member 37.

The ball valve element 24 has a substantially spherical valve surface 31 with an appropriately shaped and positioned cold inlet opening 32, hot inlet opening 34, and outlet opening 36 therethrough. The shape of the surface 31 substantially complements the concave shape of the lower surface 21 of cavity 22. The openings 32 and 34 cooperate with the respective inlet ports 18 and 19 and outlet opening 36 is in fluid connection with outlet passage 20 to regulate the mixture ratio of water and flow rate, i.e. volume of total water per unit time from the two inlet ports 18 and 19 to the outlet passage 20.

The cover assembly 16 has a control opening 40 therethrough. The cover 16 is positioned such that the longitudinal axis 28 of the valve housing 12 passes through the control opening 40. The cartridge 26 includes a housing member 56 that has an upper opening 58 aligned under opening 40.

A control stem 42 is fixedly connected to the ball valve element 24. A control stem 42 extends through the control opening 40. The control stem 42 is constructed to be affixed to a faucet lever handle 43 in a conventional fashion.

The ball valve element 24 is pivotably mounted to the cartridge housing member 56. The housing member 56 may be manufactured from known plastic material suitable for faucet applications. The ball valve element 24 also has a pair of diametrically opposed slots 60 arcing about the surface 31 of the ball valve 24. The slots 60 have a central longitudinal axis that forms part of a great circle about the ball valve. The great circle lies in a plane 73 that is disposed toward the distal end 63 of lever handle 43. The plane 73 is orthoganal to the movable axis of rotation 68 that adjusts the temperature mix of the valve.

A cylindrical shaft referred to as a pin 64 extends through the ball and through both slots 60. The pin 64 has its distal ends 66 pivotally journaled in holes 67 in cartridge housing member 56. The pin 64 is positioned to intersect the center 84 of ball valve 24 and lie perpendicular to control stem 42. The pin 64 and slots 60 are sized to slideably fit to provide limited rotation about axis 68 and be rotatable to provide rotation about the fixed axis 75 of the pin but prevent any significant rotation of the ball valve with respect to the pin along the direction that is commonly referred to as the width of the slot.

The ends 74 of the slots 60 are semicircular shape and form stop shoulders for the pin 64. The slots 60 have a width to form only enough clearance to allow sliding movement of the pin 64 in slot 60. Desirably no lateral spacing exists between slots 60 and the pin 64.

The ball valve element 24 has a lower section 90 of the valving surface 31 protruding through the large lower open end 92 of the cartridge housing 56. The protruding section 90 is a significant portion of the ball. Approximately just under half of the spherical valving surface 31 protrudes under the cartridge lower opening 92 at any given time as clearly shown in FIGS. 1 and 3. The valving surface 31 with the openings 32, 34, and 36 operably abuts the spring biased sealing elements 25.

The upper section 99 of ball element 24 is housed within the interior chamber 101 of cartridge housing 56 defined in part by interior depending cylindrical wall 103. The interior chamber 101 is in fluid communication with cavity 22 of valve housing 12.

The ball valve element 24 is retained in the correct vertical position relative to the cartridge housing by an internal brace 80 that is an integral extension of the control stem 42. The brace 80 and stem 42 portions affixed to the ball valve upper section 99 by welding. The brace may have a shoulder 81 to properly position the ball thereto. The brace 80 extends toward the center 84 of the ball valve 24 and abuts against the pin 64. In this way, the ball with its slots 60 cannot drop from its proper vertical position. The bottom of the brace has a dihedral end 82 positioned such that the edge 83 is transverse to the axis 75 of the pin 64. Two side flanges 86 also straddle the pin and extend therebelow to maintain alignment of the pin with the brace.

As shown in FIGS. 3 and 4, the annular gasket seat 94 is positioned about the upper opening 58 and faces ball element 24 within chamber 101. The gasket seat 94 is canted with its inner periphery 95 positioned higher than its outer periphery 96. A downwardly depending shoulder or collar 97 vertically depends at the inner periphery and is in close proximity to the ball valve upper section 99 to allow for manufacturing tolerances and for a slight control amount of rise as explained later. An annular gasket seal ring 98 is mounted in the cartridge housing 56 against the seat 94 such that it is placed under a preload with its inner periphery 100 twisted to be higher than its outer periphery 102. The gasket seal ring 98 has four rounded peripheral lip sections i.e. vertices 104, 106, 108, and 109. Each vertex 104, 106, 108 and 109 is circumferentially spaced approximately 900 from an adjacent vertex about central annular axis 105 of the gasket. Vertices 104 and 108 oppositely positioned at approximately 180° and vertices 106 and 109 are similarly 180° spaced apart. One of the vertices 104 positioned at a lower inner diameter position on the gasket abuts the ball valve element 24 and provides a seal therebetween against leakage of water. The respective upper inner and outer diameter positioned vertices 106 and 108 abut the canted seat 94 with inner diameter vertex 106 being positioned higher than outer diameter vertex 108 as clearly shown in FIG. 3. The upper section 99 of ball surface 31 that abuts gasket seal ring 98 is properly polished to the appropriate smoothness to provide a proper seal with the gasket.

With this seal construction, any water pressure within chamber 101 defined by cartridge housing 56 acts both upon lower seal surface 107 situated between vertices 104 and 109 and upon the outer periphery 102 situated between vertices 108 and 109 of the cross section of gasket 98. The pressure acting on the lower surface 107 situated between vertices 104 and 109 only tends to keep gasket 98 effectively engaged in seat 94 about shoulder 97 from being accidentally expelled even if the pressure increases in an abnormal fashion. The pressure acting on the outer periphery 102 situated between vertices 108 and 109 of the cross section of gasket 94 tends to deform the latter, pushing vertex 104 into contact under pressure against ball valve element 24. This contact pressure of vertex 104 with an increase in the pressure in chamber 101 and therefore maintains an efficient hold when the pressure is raised, although without maintaining a uselessly high value when the pressure in chamber 101 is reduced or at zero.

A standard and economical gasket made of commercially available elastomer material may be used while still getting reduced resistance exerted on the ball valve element when its being operated. The gasket also undergoes reduced wear and tear. The vertex 109 of gasket 98 is spaced from the lateral wall 103 of cartridge housing 56 so that the pressure prevailing in chamber 101 of the cartridge can act on the outer periphery 102 of gasket 98, which is between vertices 108 and 109. The spacing is obtained by arranging gasket 98 in an inclined position due to the inclination of seat 94.

Other seal constructions are possible such as a simple O-ring or a lip seal. The seal need not be constructed for severe compression due to threading or tightening parts together because the collar 97 provides a controlled upper limit as to the amount of pressure exerted on the seal between the ball 24 and cartridge housing 56.

The outer periphery 110 of the cartridge housing 56 has an annular groove 111 which seats an O-ring 112. The O-ring 112 is sized to seal the cartridge outer periphery 110 with the cavity 22 in lower body member 14 of housing 12.

Figures 6, 7:
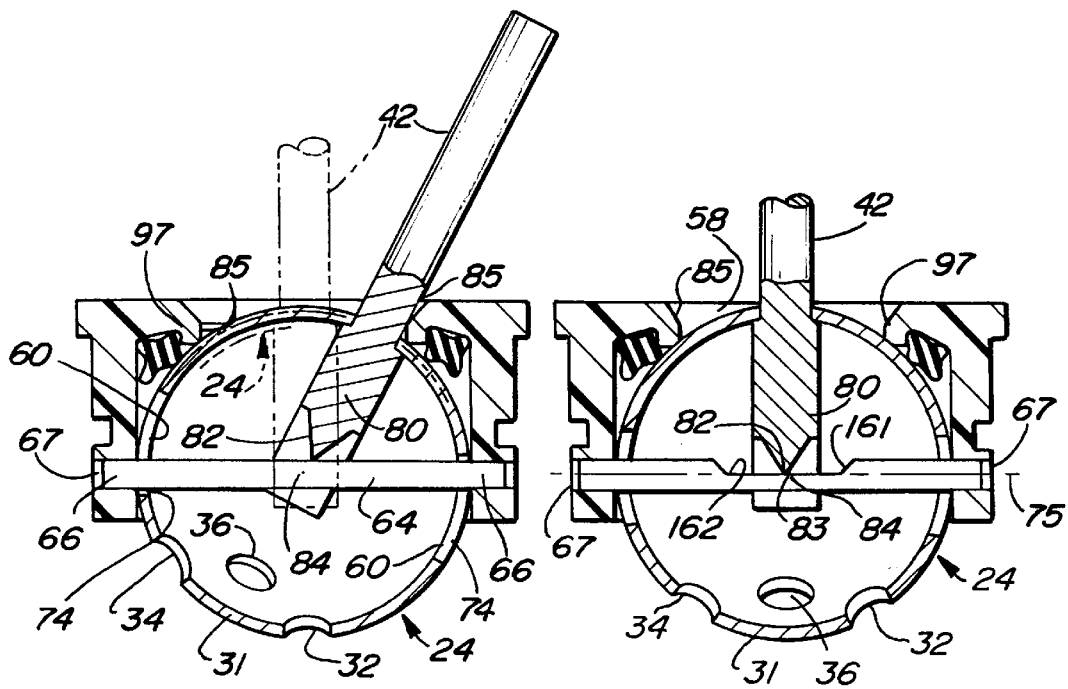
FIG. 6 is a view similar to FIG. 3 illustrating the motion of the ball valve to vary the temperature mix.
FIG. 7 is a view similar to FIG. 3 illustrating as further modification to the pin, stem and brace members.

Rocking of the control stem 42 about the fixed pin axis 75 pivots the ball valve element 24 about the pivot axis 75 independently of the rotated position of the ball valve member about movable axis 68. The brace edge 83 merely rotates about the pin. Alternately the rotates about the pin. Alternately the edge may rotate with the pin in that the pin may be constructed to also rotate about as discussed below. Furthermore, the distal ends 66 of the pin 64 may slide along slots 60 to allow the ball valve element 24 to rotate about axis 68 when the lever handle distal end 63 is swung about the axis 68. In this action as illustrated in FIG. 6, the brace has the dihedral end 82 rotate about the center 84 of the ball. Rotation from the center mix position (shown in phantom) toward either the cold position as illustrated or the hot position (on the opposite side) provides a slight lift to the ball further compressing the gasket seal 98 and provide increased compression to the seal. The increased compression slightly increases the static friction between the ball valve and the cartridge housing member at a time when the torque exerted by the weight of the handle 43 on the stem 42 is increased on lavatory faucets as shown in FIG. 1 and 6. The increased friction is therefore desirable at these positions to offset the increased torque due to the weight of the handle to prevent undesirable dropping of the handle due to gravity.

The rotation of the ball valve element 24 about axis 68 is limited by the stop shoulders 74 of slots 60 that abut pin 64. Mixer valves having different applications may have different rotation angles established by the length of slots 60 i.e. the circumferential positioning of stop shoulders 74. The rotation of the ball valve element 24 as illustrated adjusts the ratio mix and thus the temperature of the discharged mixed water.

Alternately, or in addition to the stop shoulders 74, the rotation of the ball about axis 68 and 75 may also be limited by radial edge 85 of the upper opening 58 in the cartridge housing member 56.

The cartridge is assembled with the gaskets 98 and 112 properly seated. Ball valve element 24 is then positioned against gasket 98 and slightly pressed to compress the gasket 98. The pin 64 is then passed through the slots 60 and positioned between flanges 86. The bias of the gasket 98 onto the ball 24 provides a frictional fit of the pin 64 onto the dihedral end 82 that prevents the pin 64 from easily falling out before assembly into faucet body 12. The assembled cartridge 26 is a self contained assembly that can be sold separately as a repair replacement for later installation into the faucet mixer valve 10.

The assembled cartridge 26 is placed in cavity 22 of the faucet body 14. The slot 71 properly positions the cartridge 26 with lug 72 in the cavity and ledge 130 properly vertically positions the cartridge 26 on a corresponding ledge 132 in base member 14. Cover 16 is then threaded onto the upright flange 70 to downwardly press the cartridge 26 against ledge 132.

The minimum clearance between the pin 64 and brace 80 in the vertical direction prevents undesirable vertical displacement of the ball valve element 24 with respect to the valve housing 12 and cartridge housing 56. The ball via brace 80, pin 64, and collar 97 is entrapped. Consequently, the control stem does not show any instability or render a spongy feel to the operator when the ball is pivoted along its two prescribed pivotable directions.

Referring to FIG. 7, there may be situations where the ball is not required or desired to be lifted from the mid position when moved toward to the hot or cold positions as described with FIG. 6. In this situation, the pin and brace may be easily modified to eliminate this lift. In this embodiment, the pin 64 has a central notch 161 that provides a surface 162 that is aligned with the diameter of the pin and thus the center 84 of the ball. The brace 80 is lengthened such that its dihedral end 82 has edge 83 intersect the center 84 of ball. In this construction, the dihedral edge 83 is pivoted at the center 84 of the ball 24 and thus no lifting of the ball occurs. As with the embodiments shown in FIG. 1–8, this embodiment provides the same ball motion as described above to adjust the volume flow or temperature mix. For ease of installation, the notch 161 is long enough to allow the dihedral end 82 to enter the notch after the pin intrudes in one aperture 67 but before the end of pin is installed in the opposing cartridge aperture 67. In this embodiment, during volume adjustments the stem 42 rotates the pin 64 in cartridge apertures 67 about fixed axis 75.

Figures 8, 9:
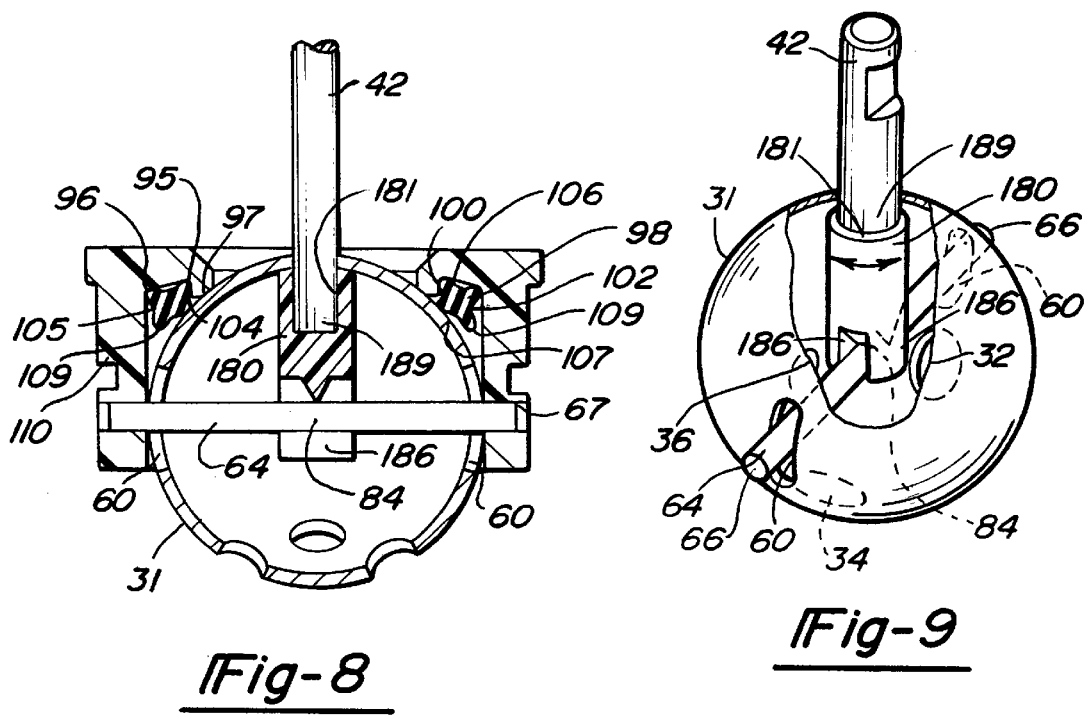
FIG. 8 is a view similar to FIG. 3 illustrating a modification to the brace member and stem.
FIG. 9 is a view similar to FIG. 5 illustrating the ball valve and collar shown in FIG. 8.

Other constructions of the brace are possible without affecting the function of the faucet. As shown in FIGS. 8 and 9, the brace may be a separate collar member 180 having a recess 181 that rotatably receives the stem 42. The stem 42 is welded in conventional fashion to the ball at the upper section 99 and has an extension 189 that rotatably fits in the recess 181. The brace 180 then self aligns to the correct rotated position when the pin 64 is inserted therethrough. To promote the self alignment, the flanges 186 may be flared to promote the simple capture of the pin during installation as the pin intrudes into the ball valve 24. The member 180 may be made from plastic or an elastomeric material to provide a limited amount of give to the brace as the ball is rotated, as shown in FIG. 8.

The invention is also adaptable for different types of ball valves that provide alternate motions for adjusting temperature mix or volume flow. As illustrated in FIG. 10–12, a ball valve 124 has a similar construction as the above described ball valve except for that the fact that slots 260 are aligned to be transverse to the stem 242 and brace 280. With this construction, the temperature mix is adjusted by rotating the stem 42 about its own axis 268. The volume is adjusted by rocking the stem about the axis 275 of the pin which is purely in the fore and aft direction of the faucet. This type of ball motion may be desirable when a knob type handle 243 such as a crystal knob is used. In this embodiment, the control stem 242 need no longer be a specially shaped diamond stem that abuts the edges 285 of aperture 215 as is known and necessary in the prior art. Instead, the mixing stops may be provided by the ends 274 of slots 160. In this fashion, the need for the precise rotational positioning of a non-round stem onto the ball valve to provide mixing stops is eliminated.

The brace 280 in this embodiment has a flat end 182. Because it does not rock along the axis 275 of the pin but only about it, the brace 280, it does not need a diehedral angle. Furthermore, because the brace 280 rotates about its own axis with respect to pin 64, flanges 86 are eliminated.

The cartridge housing 256 is similar to the one previously described with the only difference being the shape of aperture 215. Because the stem 42 rocks only in the fore and aft plane, aperture 258 may be in the form of a slot that allows the stem 42 to rock therein and rotate about its own axis therein. The inlets 232, 234 and outlet 236 are also appropriately shaped and positioned to cooperated with complementary ports of a valve housing. These ports may be substantially different than the ports 32, 34 and 36 for previously described ball valve 24. The shape and position of these ports can vary but correspond to any of a variety of known openings found in previous ball type valves with similar drive motions.

The present invention is also particularly suited to provide a ball valve 324 with a built in anti-siphoning device 300. Two embodiments are shown in FIGS. 13 and 14. In both embodiments, the upper section 99 of the ball has an aperture 310 therethrough. A perforated seat 311 has a plurality of apertures 312. The seat 311 is fitted about the stem 42 and has a collar 313 near its periphery that seats a sealing gasket 316 that sealingly abuts against the interior of ball valve 24. The collar seat has a elastomeric flap valve plate 318 normally closing off aperture 312 against the fluid pressure within the ball valve 24. However, if an accidental negative pressure occurs in the water supply which tends to cause a negative flow, the pressure inside the ball valve 24 becomes less that the atmospheric pressure, and the flap valve 318 opens up to allow air through apertures 310 to enter into the ball valve 24 which breaks any siphoning effect through the spout 29. As shown in FIG. 13, the seat 310 may be integrally formed with the flanges 386 and the stem 42 has a tapered tip i.e. the diehedral end 382 of brace 380. As shown, in FIG. 14, the seat 311 may form the entire brace 380 and include both the flanges 386 and dihedral angle 82. This embodiment can also provide the self aligning and limited resilient properties as described for the embodiment shown in FIGS. 8 and 9.

For repairs to the faucet, only those parts that are needed to be replaced, normally only the elastomeric seals 25, are in fact replaced while maintaining the advantages of ease of assembly and reassembly of a cartridge faucet assembly.

The need for a large resilient biasing regulation ring intended to push down the ball 24 against the spring biased sealing elements 25 is eliminated. Gasket seal ring 98 functions solely to prevent leakage between the ball valve element 24 and cartridge housing 56. The O-ring 112 functions solely to prevent leakage between the cartridge housing 56 and lower base member 14. The vertical position of the ball valve element 24 is affixed within the cartridge housing 56 by the pin 64 and interior brace 80. Furthermore, any adjustment ring member that has previously been incorporated into the cap member 37 to provide proper bias of the ball valve 24 against seal [elements 49] ring 98 becomes optional. The ring member may be incorporated if the cartridge 26 is retrofitted into existing faucets that previously included this ring (not shown).

Furthermore, the ball valve element 24 is incorporated into an easily replaceable valve cartridge 26 without necessitating an increase in the overall height of the valve housing 12 as compared to prior art mixing valves incorporating ball valve elements.

Furthermore, the cartridge 26 is retrofittable or usable in the standard base 14 that has been previously been fitted with ball valves found in the prior art if the ball valve has the properly designed inlets and outlet.

Furthermore, this invention eliminates the need for manufacturing square or diamond shaped stems that were needed for certain ball drive mechanisms and provides the needed control stops in the ball valve itself.

In this fashion, an easily installed ball valve drive mixing valve for a faucet is provided that can be adapted for differing ball drive motions and can be presented in a cartridge format.

Other variations and modifications are possible without departing from the scope and spirit of the present invention as defined by the appended claims.

The embodiments in which an exclusive property or privilege is claimed are defined as follows:

1. In a faucet mixer valve having a movable ball valve element mounted in a housing body that defines a cavity, said body having a plurality of inlet ports and an outlet port in fluid communication with said cavity, said ball valve element cooperating with said inlet ports to control liquid flow in both flow rate and temperature mix through said ports, said ball valve body having a control opening therethrough, said valve element having a control stem connected thereto and extending through said control opening, the improvement characterized by:

said mixer valve being in cartridge form with a cartridge having a housing member;

said cartridge housing member having an upper opening for allowing said control stem passing therethrough;

said cartridge having a lower opening through which said movable ball valve element protrudes into said recess in said housing body to be cooperative with said inlet ports;

said cartridge housing having a seal seat about said upper opening;

a sealing gasket seated in said seal seat about said upper opening in said cartridge housing and sealingly abuttable against said movable ball valve element;

said ball valve having a first arcuate slot therethrough substantially aligned with a great circle of said ball;

a shaft being journaled in said cartridge against any lateral sliding motion and extending through said slot of said ball, said ball being rotatable about an axis of said shaft at a point where said shaft extends through said slot of said ball;

said shaft extending into the interior of said ball valve;

a brace affixed against an upper section of said ball valve and extending to and abutting the shaft to provide a support to prevent the ball from dropping out of the lower opening of said cartridge.

2. In a faucet mixer valve as defined in claim 1 further characterized by:

said brace member has an end including a dihedral that abuts against the shaft and lateral flanges that abut diametrically opposite sides of the shaft.

3. In a faucet mixer valve as defined in claim 2 further characterized by:

said shaft extending to the center of said interior of said ball valve;

said brace abutting said shaft in proximity to the center of said shaft but slightly spaced therefrom such that upon rocking motion of said ball valve along an axis perpendicular to said shaft from a mid position of said stem to a side position of said stem, said brace lifts said ball with respect to said shaft to increase the compression of said sealing gasket between said ball valve and said cartridge.

4. In a faucet mixer valve as defined in claim 1 further characterized by:

said ball having a second arcuate slot diametrically opposed to said first slot;

said shaft extending through both of said first and second slots and being seated at both its distal ends in said cartridge housing.

5. In a faucet mixer valve as defined in claim 4 further characterized by:

said shaft having a circular cross-section to provide relative rotation of the ball with respect to the cartridge housing about the axis of the shaft.

6. In a faucet mixer valve as defined in claim 5 further characterized by:

said slots being on a great circle that defines a plane that is in proximity to a distal end of handle that is affixed to said control stem and having a normal axis that is perpendicular to said shaft such that said ball valve may move in two directions, one of the directions being about said normal axis and a second direction being about the axis of said shaft.

7. In a faucet mixer valve as defined in claim 5 further characterized by:

said slots being on a great circle that defines a plane that is normal to said control stem such that such that said ball valve may move in two direction, one of the directions being about a central axis of said stem and a second direction being about the axis of said shaft.

8. In a faucet mixer valve as defined in claim 5 further characterized by:

said brace member has an end including a dihedral that abuts against the shaft and lateral flanges that abut diametrically opposite sides of the shaft.

9. In a faucet mixer valve as defined in claim 8 further characterized by:
said brace member being an extension of said control stem that passes into said ball valve.

10. In a faucet mixer valve as defined in claim 8 further characterized by:
said brace member being a separate member that is rotatable with respect to said control stem and provides the dihedral angle and lateral flanges and rotates until properly oriented to allow said shaft to intrude between said lateral flanges upon installation of said shaft in said ball valve.

11. In a faucet mixer valve as defined in claim 8 further characterized by:
a seat mounted about said brace and defining an anti-siphon valve inside said ball valve and in communication with an aperture through an upper section of said ball valve.

12. In a faucet mixer valve as defined in claim 1 further characterized by:
said cartridge housing having a depending flange interposed between said upper opening said seal seat, said flange being in close proximity to said ball valve and provides a stop limit to the upward motion of said ball valve against said seal in order to control the maximum amount of compression of the seal.

13. In a faucet mixer valve as defined in claim 12 further characterized by:
said brace member has an end including a dihedral that abuts against the shaft and lateral flanges that abut diametrically opposite sides of the shaft.

14. In a faucet mixer valve as defined in claim 13 further characterized by:
said shaft extending to the center of said interior of said ball valve;
said brace abutting said shaft in proximity to the center of said shaft but slightly spaced therefrom such that upon rocking motion of said ball valve along an axis perpendicular to said shaft from a mid position of said stem to a side position of said stem, said brace lifts said ball with respect to said shaft to increase the compression of said sealing gasket between said ball valve and said cartridge.

15. In a faucet mixer valve as defined in claim 12 further characterized by:
said ball having a second arcuate slot diametrically opposed to said first slot;
said shaft extending through both of said first and second slots and being seated at both its distal ends in said cartridge housing.

16. In a faucet mixer valve as defined in claim 11 further characterized by:
said shaft having a circular cross-section to provide relative rotation of the ball with respect to the cartridge housing about the axis of the shaft.

17. In a faucet mixer valve as defined in claim 16 further characterized by:
said slots being on a great circle that defines a plane that is in proximity to a distal end of handle that is affixed to said control stem and having a normal axis that is perpendicular to said shaft such that said ball valve may move in two direction, one of the directions being about said normal axis and a second direction being about the axis of said shaft.

18. In a faucet mixer valve as defined in claim 16 further characterized by:
said slots being on a great circle that defines a plane that is normal to said control stem such that such that said ball valve may move in two direction, one of the directions being about a central axis of said stem and a second direction being about the axis of said shaft.

19. In a faucet mixer valve as defined in claim 16 further characterized by:
said brace member has an end including a dihedral that abuts against the shaft and lateral flanges that abut diametrically opposite sides of the shaft.

20. In a faucet mixer valve as defined in claim 19 further characterized by:
said brace member being an extension of said control stem that passes into said ball valve.

21. In a faucet mixer valve as defined in claim 19 further characterized by:
said brace member being a separate member that is rotatable with respect to said control stem and provides the dihedral angle and lateral flanges and rotates until properly oriented to allow said shaft to intrude between said lateral flanges upon installation of said shaft in said ball valve.

22. In a faucet mixer valve as defined in claim 19 further characterized by:
a seat mounted about said brace and defining an anti-siphon valve inside said ball valve and in communication with an aperture through an upper section of said ball valve.

23. In a faucet mixer valve having a movable ball valve element mounted in a housing body that defines a cavity, said body having a plurality of inlet ports and an outlet port in fluid communication with said cavity, said ball valve element cooperating with said inlet ports to control liquid flow in both flow rate and temperature mix through said ports, said ball valve body having a control opening therethrough, said valve element having a control stem connected thereto and extending through said control opening, the improvement characterized by:
said mixer valve being in cartridge form with a cartridge having a housing member;
said cartridge housing member having an upper opening for allowing said control stem passing therethrough;
said cartridge having a lower opening through which said movable ball valve element protrudes into said recess in said housing body to be cooperative with said inlet ports;
a sealing gasket being seated between said ball valve and said cartridge housing for preventing fluid flow through said upper opening in said cartridge housing;
said ball valve having a first arcuate slot therethrough;
a protrusion being translationally affixed to said cartridge and extending through said slot of said ball, said ball being rotatable about an axis of said protrusion at a point where it extends through said slot of said ball;
a support extending from said protrusion within a hollow interior section of said ball to abut against an upper section of the ball valve to provide a support against the ball from dropping down through the lower opening of said cartridge.

24. In a faucet mixer valve as defined in claim 23 further characterized by:
said cartridge housing having a depending flange interposed between said upper opening said sealing gasket, said flange being in close proximity to said ball valve and provides a stop limit to the upward motion of said ball valve against said sealing gasket in order to control the maximum amount of compression of the sealing gasket.

25. A ball valve cartridge for a mixer valve characterized by:

a ball valve element having at least one inlet and an outlet;

said cartridge housing member having an upper opening for allowing a control stem passing therethrough;

a cartridge housing having a lower opening through which said movable ball valve element protrudes, said ball valve element being seatable in proximity to inlet ports with said mixer valve below said cartridge such that its at least one inlet is selectively alignable or misalignable with said inlet ports;

a sealing gasket being seated between said ball valve and said cartridge housing for preventing fluid flow through said upper opening in said cartridge housing;

said ball valve having a first arcuate slot therethrough;

a protrusion being translationally affixed to said cartridge and extending through said slot of said ball, said ball being rotatable about an axis of said protrusion at a point where it extends through said slot of said ball;

a support extending from said protrusion within a hollow interior section of said ball to abut against an upper section of the ball valve to provide a support against the ball from dropping down through the lower opening of said cartridge.

26. A ball valve cartridge as defined in claim 25 further characterized by:

said cartridge housing having a depending flange interposed between said upper opening said sealing gasket, said flange being in close proximity to said ball valve and provides a stop limit to the upward motion of said ball valve against said sealing gasket in order to control the maximum amount of compression of the sealing gasket.

27. A ball valve cartridge as defined in claim 26 further characterized by:

said protrusion being a shaft that is journaled in said cartridge and extends through said slot of said ball, said ball being rotatable about an axis of said shaft at a point where said shaft extends through said slot of said ball;

said shaft extending to the center of said interior of said ball valve;

said brace abutting said shaft in proximity to the center of said shaft but slightly spaced therefrom such that upon rocking motion of said ball valve along an axis perpendicular to said shaft from a mid position of said stem to a side position of said stem, said brace lifts said ball with respect to said shaft to increase the compression of said sealing gasket between said ball valve and said cartridge.

28. A ball valve cartridge as defined in claim 27 further characterized by:

said brace member having an end including a dihedral that abuts against the shaft and lateral flanges that abut diametrically opposite sides of the shaft.

29. A ball valve cartridge as defined in claim 28 further characterized by:

said brace member being an extension of said control stem that passes into said ball valve.

30. A ball valve cartridge as defined in claim 28 further characterized by:

said brace member being a separate member that is rotatable with respect to said control stem and provides the dihedral and lateral flanges and rotates until properly oriented to allow said shaft to intrude between said lateral flanges upon installation of said shaft in said ball valve.

31. A ball valve cartridge as defined in claim 28 further characterized by:

a seat mounted about said brace and defining an antisiphon valve inside said ball valve and in communication with an aperture through an upper section of said ball valve.

32. A ball valve cartridge as defined in claim 27 further characterized by:

said ball having a second arcuate slot diametrically opposed to said first slot;

said shaft extending through both of said first and second slots and being seated at both its distal ends in said cartridge housing.

33. A ball valve cartridge as defined in claim 32 further characterized by:

said shaft having a circular cross-section to provide relative rotation of the ball with respect to the cartridge housing about the axis of the shaft.

34. A ball valve cartridge as defined in claim 33 further characterized by:

said slots being on a great circle that defines a plane that is inclined with respect to the control stem and having a normal axis that is perpendicular to said shaft such that said ball valve may move in two directions, one of the directions being about said normal axis and a second direction being about the axis of said shaft.

35. A ball valve cartridge as defined in claim 33 further characterized by:

said slots being on a great circle that defines a plane that is normal to said control stem such that such that said ball valve may move in two direction, one of the directions being about a central axis of said stem and a second direction being about the axis of said shaft.

36. A ball valve cartridge as defined in claim 33 further characterized by:

said brace member has an end including a dihedral that abuts against the shaft and lateral flanges that abut diametrically opposite sides of the shaft.

37. A ball valve cartridge as defined in claim 36 further characterized by:

said brace member being an extension of said control stem that passes into said ball valve.

38. A ball valve cartridge as defined in claim 25 further characterized by:

said protrusion being a shaft that is journaled in said cartridge and extends through said slot of said ball, said ball being rotatable about an axis of said shaft at a point where said shaft extends through said slot of said ball;

said shaft extending to the center of said interior of said ball valve;

said brace abutting said shaft in proximity to the center of said shaft but slightly spaced therefrom such that upon rocking motion of said ball valve along an axis perpendicular to said shaft from a mid position of said stem to a side position of said stem, said brace lifts said ball with respect to said shaft to increase the compression of said sealing gasket between said ball valve and said cartridge.

39. A ball valve cartridge as defined in claim 38 further characterized by:

said ball having a second arcuate slot diametrically opposed to said first slot;

said shaft extending through both of said first and second slots and being seated at both its distal ends in said cartridge housing.

40. A ball valve cartridge as defined in claim 39 further characterized by:

said shaft having a circular cross-section to provide relative rotation of the ball with respect to the cartridge housing about the axis of the shaft.

41. A ball valve cartridge as defined in claim 40 further characterized by:

said slots being on a great circle that defines a plane that is inclined with respect to the control stem and having a normal axis that is perpendicular to said shaft such that said ball valve may move in two directions, one of the directions being about said normal axis and a second direction being about the axis of said shaft.

42. A ball valve cartridge as defined in claim 40 further characterized by:

said slots being on a great circle that defines a plane that is normal to said control stem such that such that said ball valve may move in two directions, one of the directions being about a central axis of said stem and a second direction being about the axis of said shaft.

43. A ball valve cartridge as defined in claim 40 further characterized by:

said brace member has an end including a dihedral that abuts against the shaft and lateral flanges that abut diametrically opposite sides of the shaft.

44. A ball valve cartridge as defined in claim 43 further characterized by:

said brace member being an extension of said control stem that passes into said ball valve.

45. A ball valve for a faucet characterized by:

said ball valve having a first arcuate slot therethrough substantially about a great circle of said ball;

a brace affixed against an upper section of said ball valve and extending to and abuttable against a shaft that is extendable through said slot of said ball, said ball being rotatable about an axis of said shaft at a point where said shaft extends through said slot of said ball.

46. In a faucet mixer valve having a movable ball valve element mounted in a housing body that defines a cavity, said body having a plurality of inlet ports and an outlet port in fluid communication with said cavity, said ball valve element cooperating with said inlet ports to control liquid flow in both flow rate and temperature mix through said ports, said valve body having a control opening therethrough, said valve element having a control stem connected thereto and extending through said control opening in a cap member, the improvement characterized by:

said cap member having a seal seat about said control opening;

a sealing gasket seated in said seal seat about said upper opening in said cap member and sealingly abuttable against said movable ball valve element;

said ball valve having a first arcuate slot therethrough aligned substantially with a great circle of said ball;

a shaft being journaled in said body against any lateral sliding motion and extending through said slot of said ball, said ball being rotatable about an axis of said shaft at a point where said shaft extends through said slot of said ball;

said shaft extending into the interior of said ball valve; and a brace affixed against an upper section of said ball valve and extending to and abutting the shaft.

47. In a faucet mixer valve as defined in claim 46 further characterized by:

said shaft extending to the center of said interior of said ball valve;

said brace abutting said shaft in proximity to the center of said shaft but slightly spaced therefrom such that upon rocking motion of said ball valve along an axis perpendicular to said shaft from a mid position of said stem to a side position of said stem, said brace lifts said ball with respect to said shaft to increase the compression of said sealing gasket between said ball valve and said cartridge.

48. In a faucet mixer valve as defined in claim 46 further characterized by:

said ball having a second arcuate slot diametrically opposed to said first slot;

said shaft extending through both of said first and second slots and being seated at both its distal ends in said cartridge housing.

49. In a faucet mixer valve as defined in claim 48 further characterized by:

said shaft having a circular cross-section to provide relative rotation of the ball with respect to the cartridge housing about the axis of the shaft.

50. In a faucet mixer valve as defined in claim 49 further characterized by:

said slots being on a great circle that defines a plane that is in proximity to a distal end of handle that is affixed to said control stem and having a normal axis that is perpendicular to said shaft such that said ball valve may move in two directions, one of the directions being about said normal axis and a second direction being about the axis of said shaft.

51. In a faucet mixer -valve as defined in claim 49 further characterized by:

said slots being on a great circle that defines a plane that is normal to said control stem such that such that said ball valve may move in two directions, one of the directions being about a central axis of said stem and a second direction being about the axis of said shaft.

* * * * *

UNITED STATES PATENT AND TRADEMARK OFFICE
CERTIFICATE OF CORRECTION

PATENT NO. : 5,813,435
DATED : September 29, 1998
INVENTOR(S) : Alfons Knapp

It is certified that error appears in the above-identified patent and that said Letters Patent is hereby corrected as shown below:

Column 5, line 13, after "stem" please delete "such that", first occurrence.

Column 5, line 58, please delete "of the".

Column 6, line 8, please delete "of the".

Column 7, line 66, after "approximately" please delete "900" and insert therefor --90°--.

Column 8, line 56, after "pin", first occurrence, please delete "alternatively the rotates about the pin".

Column 11, line 23, after "seal" please delete "[elements 49]".

Column 12, line 59, after "stem" please delete "such that", first occurrence.

Column 14, line 2, after "stem" please delete "such that", first occurrence.

Column 16, line 34, after "stem", please delete "such that", first occurrence.

UNITED STATES PATENT AND TRADEMARK OFFICE
CERTIFICATE OF CORRECTION

PATENT NO. : 5,813,435
DATED : September 29, 1998
INVENTOR(S) : Alfons Knapp

It is certified that error appears in the above-identified patent and that said Letters Patent is hereby corrected as shown below:

Column 17, line 21, after "stem", please delete "such that", first occurrence.

Column 18, line 52, after "stem", please delete "such that", first occurrence.

Signed and Sealed this

Fifteenth Day of February, 2000

*Attest:*

Q. TODD DICKINSON

*Attesting Officer*  Commissioner of Patents and Trademarks